May 26, 1959 J. FOSSA 2,887,699
SHIELD MECHANISM FOR TURRET STRUCTURE
Original Filed Dec. 19, 1952 5 Sheets—Sheet 1

Inventor
Joseph Fossa
By his Attorney
Maxwell Fish

Inventor
Joseph Fossa
By his Attorney
Maxwell Fish

May 26, 1959  J. FOSSA  2,887,699
SHIELD MECHANISM FOR TURRET STRUCTURE
Original Filed Dec. 19, 1952  5 Sheets-Sheet 3

Inventor
Joseph Fossa
By his Attorney
Maxwell Fish

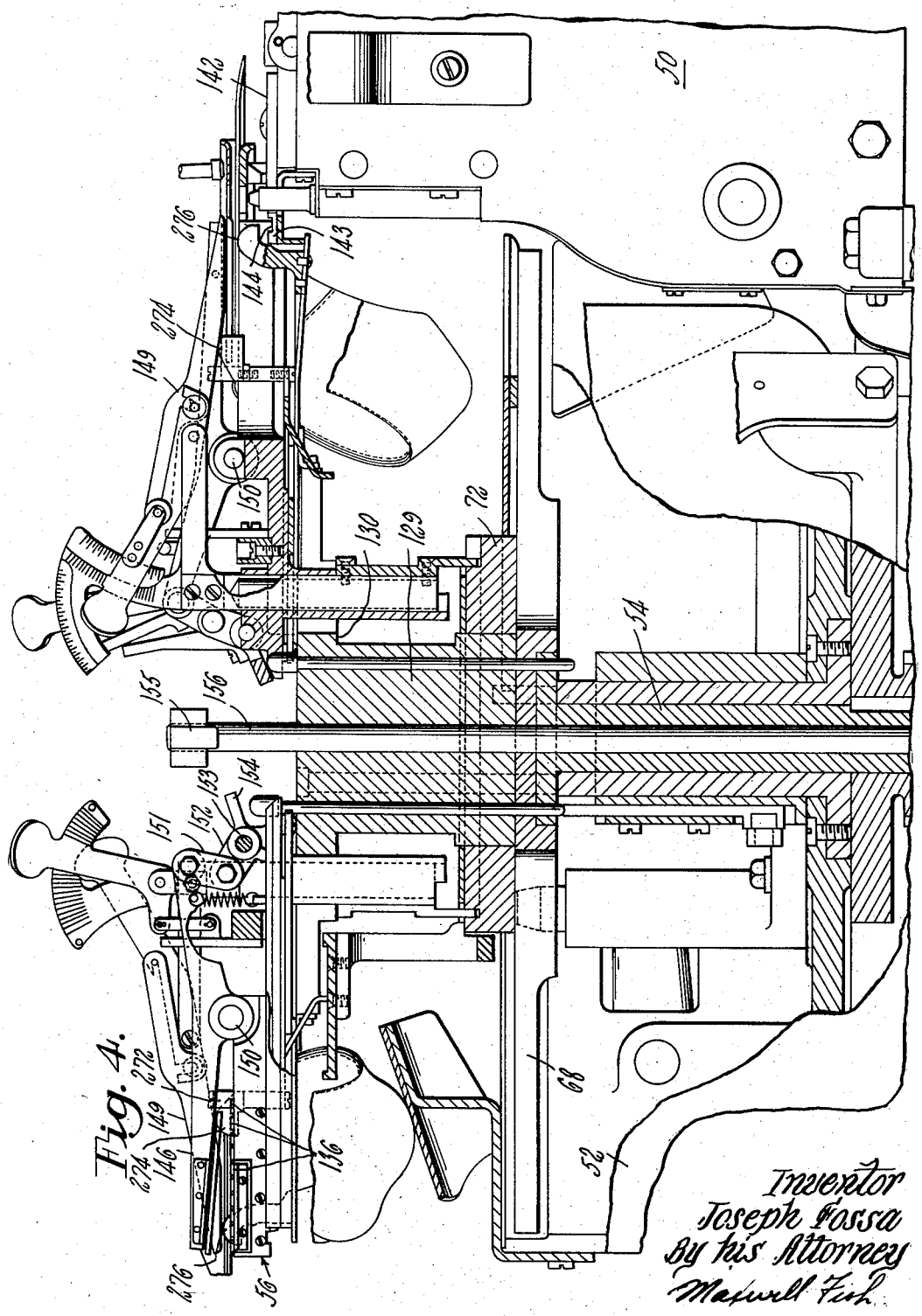

United States Patent Office 2,887,699
Patented May 26, 1959

2,887,699
SHIELD MECHANISM FOR TURRET STRUCTURE

Joseph Fossa, South Hamilton, Mass., assignor to United Shoe Machinery Corporation, Flemington, N.J., a corporation of New Jersey Original application December 19, 1952, Serial No. 326,948. Divided and this application May 26, 1958, Serial No. 737,635

6 Claims. (Cl. 12—58.5)

The present invention relates to improvements in devices for guiding and supporting a shoe upper while held in an opened-out lace-receiving position on a workholder for transfer and for in and out movements on a rotatable turret with relation to eyeleting, lacing and loading and discharge stations disposed about the turret, and more particularly to a shield mechanism associated with the turret structure.

The invention is herein disclosed as embodied in a machine for automatically eyeleting and lacing the eyeleted upper in many respects similar to that shown in the patent to Fossa, No. 2,461,889, dated February 15, 1949, for Machine and Method for Manufacture of Shoes. The present application is a division of the copending application of Fossa Ser. No. 326,948 for Machine for Operating Upon Shoe Uppers filed in the U.S. Patent Office December 19, 1952. The machine referred to, in general, provides a rotatable work supporting turret on which are carried four radially movable workholders each provided with clamping devices for supporting the upper with the lacing margins thereof in an opened-out edge-facing relation and with the heel portion of the upper extending radially inwardly on the workholder toward the axis of the turret. Disposed about the turret are a loading station including means which enable the operator to locate and to secure the upper on the workholder in an exactly predetermined position in accordance with the size and style of the upper to be operated upon. By successive quarter turns of the turret the workholder and upper supported thereon are brought successively into operating relation with an eyeleting machine for inserting eyelets in successive pairs in the upper, and into operating relation with a lacing machine for lacing the eyeleted upper. A further quarter turn of the turret brings the workholder to an unloading station at which the eyeleted and laced upper is released from the workholder preparatory for removal from the machine.

It is a principal object of the invention to provide an auxiliary device which is well adapted to assist in guiding and supporting the heel portion of a shoe upper mounted in an opened-out position with the lacing margins disposed in an edge-facing relation on a workholder on the rotatable turret, particularly during the transfer of the shoe holder with the rotatable turret through the last quadrant of its movement from the unclamping station to the loading station of the machine, and further during the loading and unloading of the upper from the workholder at the loading station.

With the above and other objects in view as may hereinafter appear, the several features of the invention should be readily understood by one skilled in the art from the following description taken in connection with the accompanying drawings in which:

Fig. 4 is a view in front elevation of the turret and workholder assembly partly sectioned on a section line passing through the turret axis, two of the workholders disposed respectively at the eyeleting and unloading stations being shown;

Figure 5:
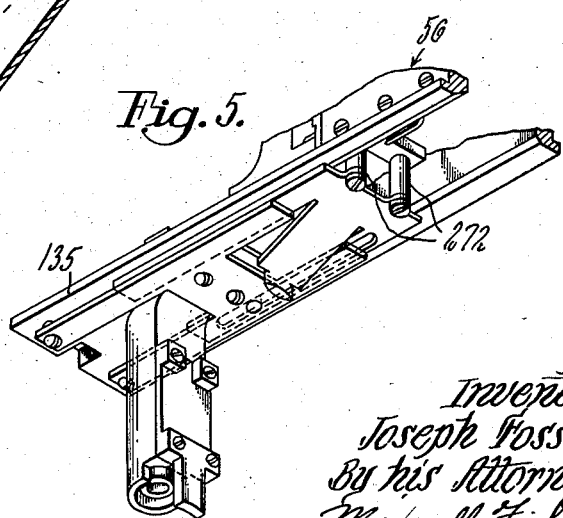
Figure 6:
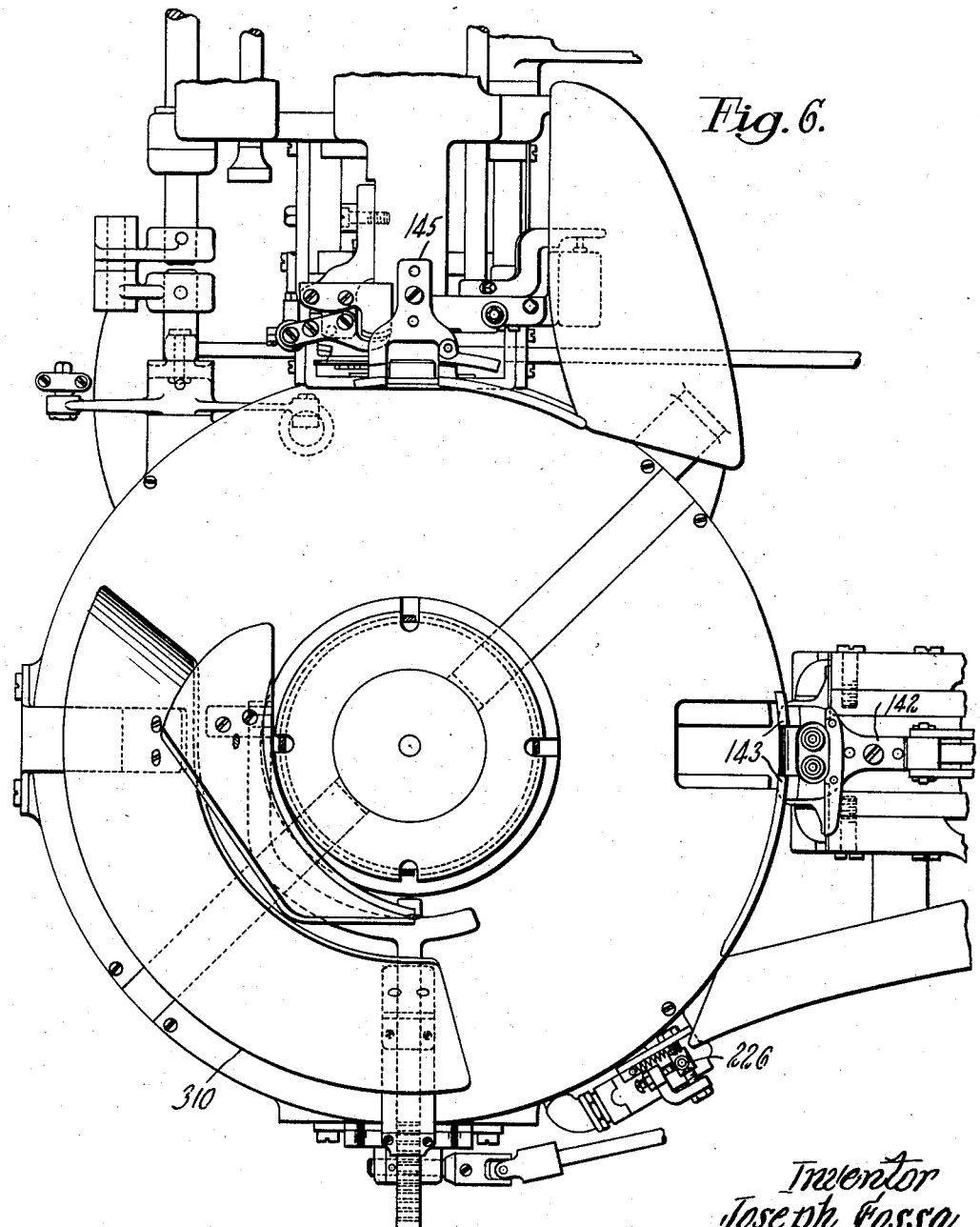

Fig. 5 is an isometric view looking from below illustrating portions of one of the workholders, and the shoe upper locating slide with the locating pins and fin slidably mounted on the work holder; and Fig. 6 is a somewhat fragmentary plan view of the work supporting turret casing including the cover for the turret casing, the locating device, the feed slides at each of the eyeleting and lacing stations, and certain of the upper guiding and shielding surfaces provided in accordance with the invention.

Figure 1:
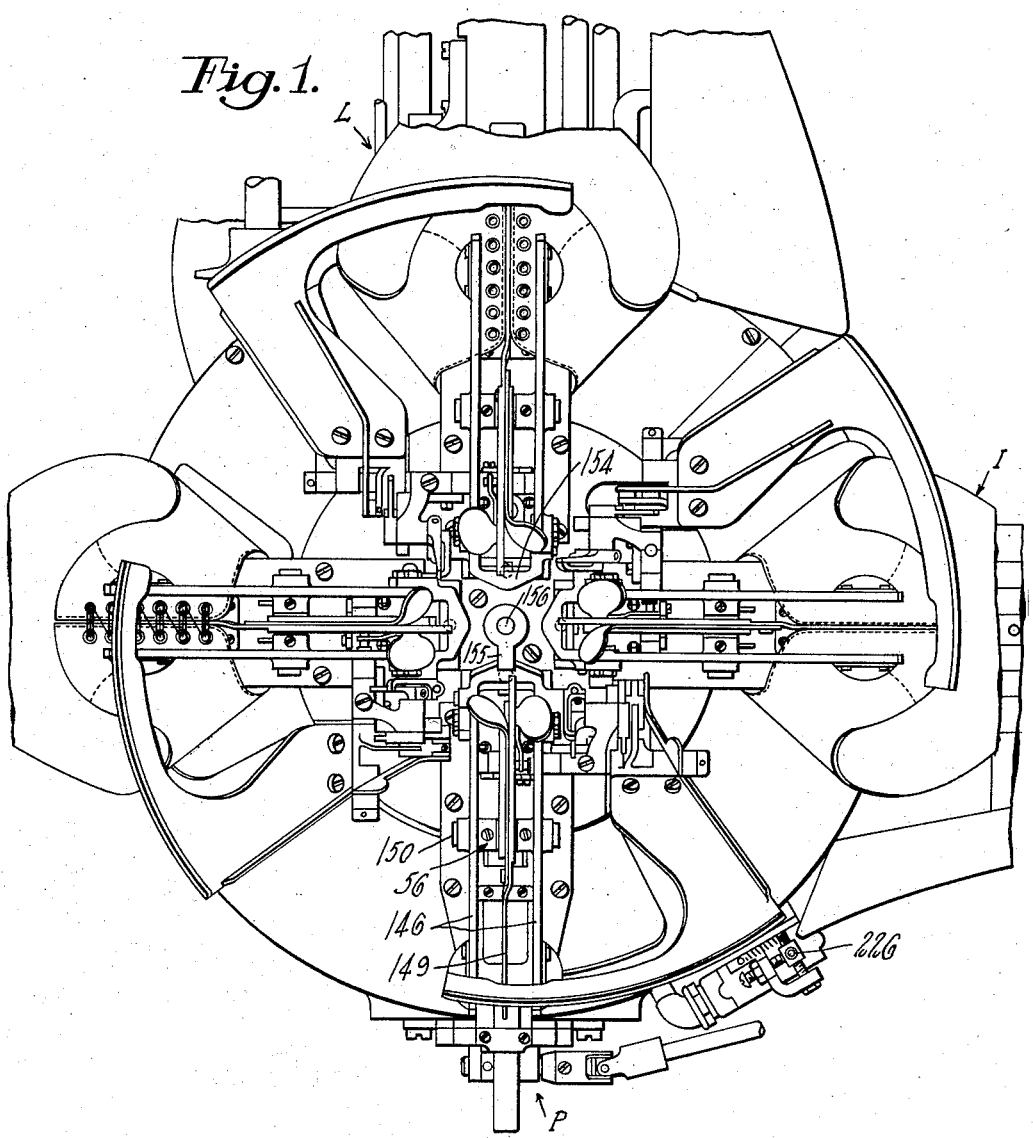
Fig. 1 is a fragmentary plan view of an automatic machine for eyeleting and for lacing the eyeleted shoe upper illustrating particularly the work supporting and transfer assembly of the machine including the turret and four workholders.
Figure 2:
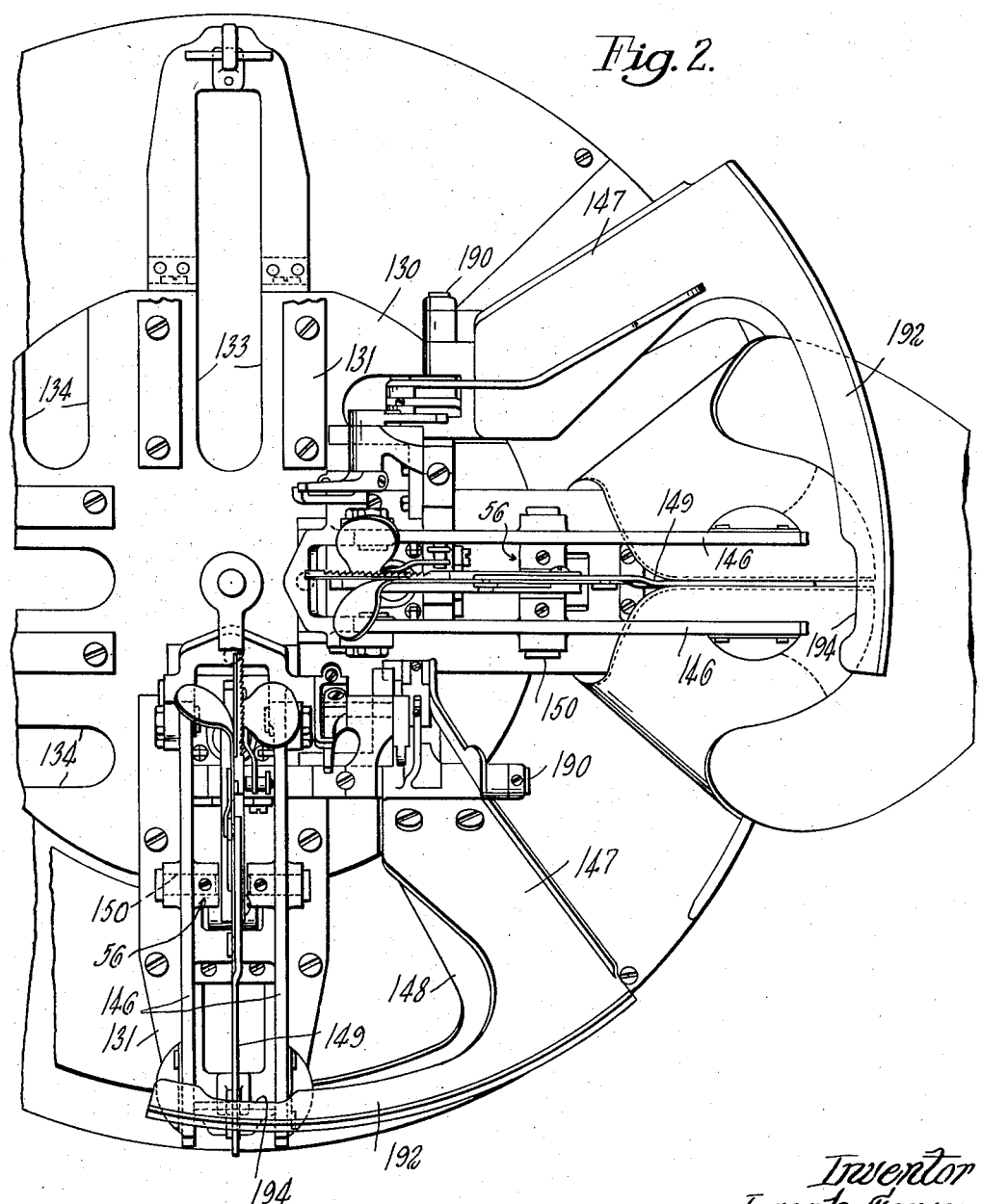
Fig. 2 is a fragmentary view on an enlarged scale of the turret mechanism shown in Fig. 1 illustrating one of the workholders with an upper clamped therein, a second workholder in its open position and a third workholder partially broken away to show underlying parts.

Referring to the drawings, the general arrangement of the improved machine disclosed for performing related eyeleting and lacing operations upon a shoe upper is generally indicated in the plan views, Fig. 1, 2 and 6 and in the partly sectioned side view, Fig. 4, only so much of the machine, however, being shown as believed necessary to illustrate the connection of the present invention therewith. For a more detailed disclosure of the machine, reference may be had to the Fossa Patent No. 2,461,889, above referred to. In the present disclosure, the base of the machine is generally indicated at 50 (see Fig. 4) and includes a cylindrical casing 52 within which is mounted an indexing work supporting turret 54. The turret provides support for four workholders 56 which are mounted on guideways extending radially outward from the turret at 90° angles from one another. At the front side of the machine, there is provided a locating station which comprises a locating mechanism generally indicated at P for the assistance of the operator in locating and clamping successive uppers on the workholders. At the remaining stations proceeding in a counterclockwise direction around the turret there are provided an eyeleting mechanism generally indicated at I, a lacing mechanism generally indicated at L, and a fourth station between the lacing and loading station at which the workholding clamps are released.

Figure 3:
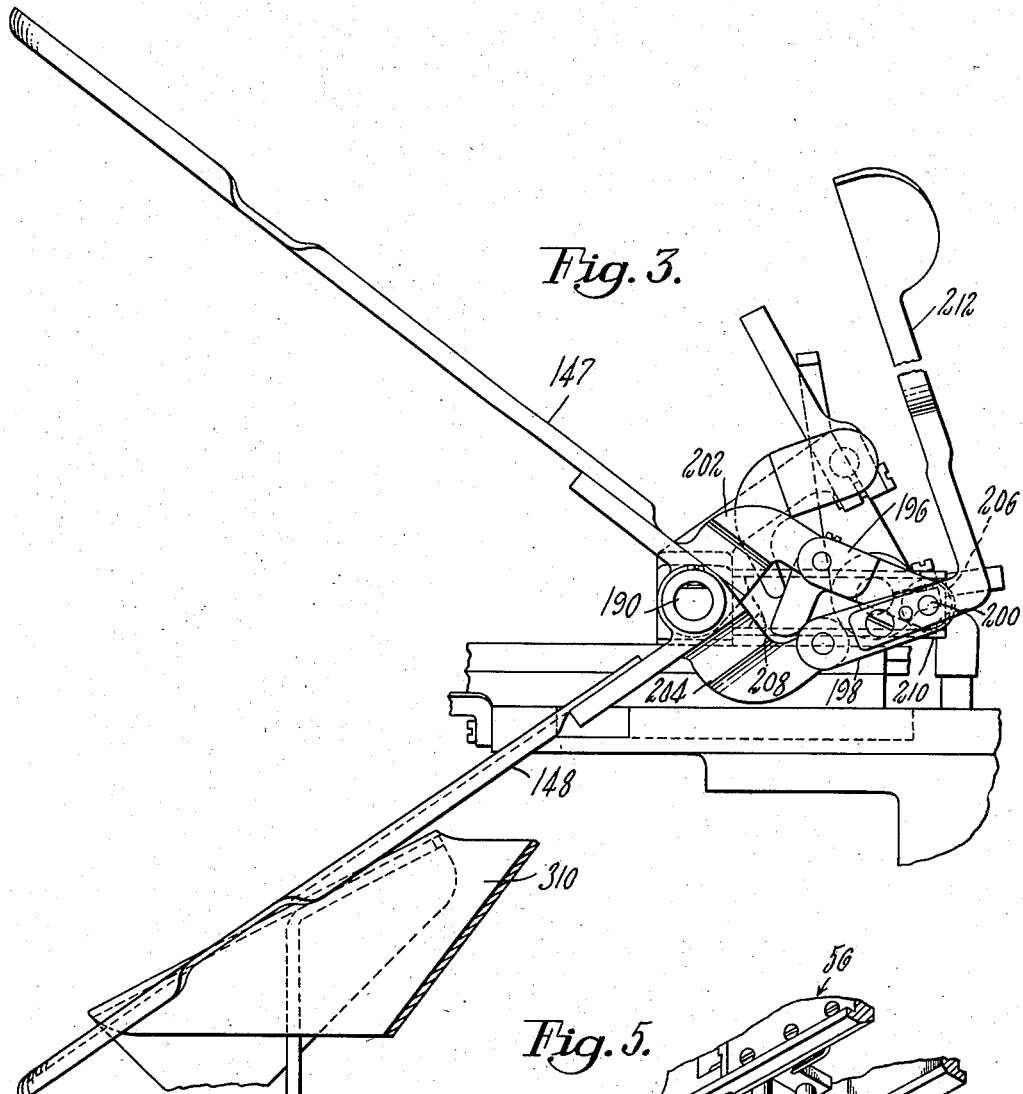
Fig. 3 is a detail view in side elevation on a still larger scale illustrating particularly the toggle control and toggle trip mechanism for the vamp spreaders with the toggle connection broken and the vamp spreaders fully retracted to their open position.

With the present construction the turret 54 is provided with an upward extension or hub 129 which is rigidly secured to the turret shaft 54 and table member 68 and is formed with a table top or disc 130 which is of substantially smaller diameter than the disc member 68 previously referred to (see Figs. 2 and 4). At its lower end the hub 129 is externally supported by the sleeve bearing member 72. The table top 130 provides support for four guideways 131 (see Fig. 2) which extend radially outwardly from the turret at 90° angles to one another to receive the respective workholders 56. It will be noted that the guideways are each formed of two rails spaced from one another to form an open slot therebetween and that radially extending channels 133 are cut into the table top 130, forming inward extensions of the slots provided between the rails of the respective guideways. A second channel 134 cut inwardly into the periphery of the disc 130 in parallel relation to each channel 133 is adapted to receive the shank portion of the lower vamp spreader 148 when the vamp spreader is in its downwardly projecting open position, and the workholder has been retracted on its support as shown in Fig. 3.

Each workholder 56 of the illustrated construction, see Figs. 4 and 5, comprises a generally U-shaped member having outwardly flanged edges 135 forming guides which ride under the recessed edges of the rail guideway 131, and two parallel sets of upwardly extending resiliently mounted pins 136 (see Fig. 4) which form the lower relatively stationary elements of a clamping device for engaging the two adjoining edge portions of the upper.

In accordance with the disclosure of the Fossa patent above referred to, each of the eyeleting and lacing machines is provided with a feed slide which is operatively connected with the workholder presented at the particular station, and which thereafter acts to feed the workholder from a fully retracted position on its guideways 131 toward the axis of the turret into the respective machine and then to return the workholder to its retracted transfer position. The feed slide associated with the eyeleting machine is indicated at 142 (see Fig. 4) having a bifurcated outer end 143 notched for locking engagement with corresponding formed notches 144 in the workholder. The feed slide associated with the lacing machine is indicated at 145 (see Fig. 6) similarly formed with a bifurcated and notched outer end portion for engagement with the workholders presented successively thereto by the indexing movement of the turret.

Each workholder 56 as shown, for example, in Fig. 4, has mounted thereon a pair of movable work clamping jaws 146, a pair of vamp spreaders 147, 148 (Fig. 3), and a lace measuring or slotting bar 149. The work clamping jaws 146 comprise a pair of lever arms which are supported intermediate their length on a pivot shaft 150 on the workholder 56 (see Figs. 2 and 4), and are connected at their rear ends to identical toggle links 151 which are pivotally connected to toggle arms 152 rotatably supported on a laterally extending pivot pin 153 at the rear end of the workholder 56. The toggle arms 152 are connected to turn as a single unit by a strap 154 arranged to be engaged by an actuating lug 155 secured to the upper end of an axially movable control shaft 156 which is preferably connected to be moved downwardly by a treadle control, not here specifically shown.

The work clamping jaws 146 are released prior to the final indexing movement which transfers the work support with the eyeleted and laced upper held thereon back to the loading station by means of an automatic release mechanism which is substantially similar to corresponding mechanism of the Fossa patent.

As best shown in Figs. 2 and 3, the vamp spreader associated with each workholder consists of upper and lower arms 147, 148, above noted, each formed and arranged to swing about a common pivot 190 and connected for related movements to engage simultaneously against opposite faces of the vamp portion of the upper. Each of the arms 147, 148 is provided at its outer end with a relatively slender, curved lateral extension 192 which for the engaging position of the vamp spreader passes across the vamp portion of the upper immediately beyond the end of the lacing slit. It will be noted that each extension 192 has a cut-away portion 194 which serves to provide additional space for the performance of the eyeleting and lacing operations along the length of the lacing slit in the upper. The vamp spreader arms 147, 148 are connected to move toward and away from each other as a unit by means of a toggle connection consisting of a toggle arm 196 and a toggle link 198 connected together by a pivot pin 200. The arm 196 is connected at its free end to an arm 202 extending rearwardly from the base of the vamp spreader arm 147, and the free end of the toggle link 198 is similarly connected to a rearwardly extending arm 204 formed integrally with the vamp spreader arm 148. For the further control of the toggle, connecting pivot pin 200 is provided at one end with a cam roll 206 which rides in a U-shaped slot 208 formed in a block 210 secured to the workholder 132. A weighted arm 212 forming a right angle extension of toggle link 198 provides a convenient manual means for straightening the toggle when desired. In order to move the vamp spreader unit to its closed position, the operator pushes the vamp spreader arm 147 downwardly. The weighted lever 212 which is thus caused to move from the position of Fig. 3 to the clamping position will have sufficient momentum to move the toggle links to a past center locking position.

The vamp spreader is automatically released at the same time that the clamping jaws clamping the upper in position are opened by means of connections not here described which are actuated from the work clamp toggle connections.

The shoe upper is located on the workholder 56 at the loading station P in a manner similar to that employed in the Fossa Patent No. 2,461,889, above referred to. The upper in a flattened-out condition and with the two edges of the lacing slit in an edge-facing relation is placed on the workholder with the heel portion thereof extending inwardly toward the center of the turret. In the event that the upper is placed in position with the inside surface thereof up for the insertion of invisible eyelets, the heel portion of the upper will be positioned above clamping level and will be placed in an encircling position over the movable upper clamping jaws 146 and lace measuring bar 149. If, as contemplated alternatively in accordance with the present invention, the upper is located in a spread-out position with the outside surface of the upper facing upwardly for the insertion of visible eyelets, the heel portion of the upper will be placed in a depending position encircling the lower portion of the workholder 132 and guideway 131. In either event the upper in its spread-out position is moved inwardly on the workholder to a position in which the edges of the ankle portion of the upper adjacent the lacing slit engage against two rotating pins 272 which are located with relation to the workholder at the loading station in accordance with the setting of the sizing device for the machine. At the same time the edges of the lacing slit are positioned laterally on the workholders by engagement with two fins 274 and 276 arranged to project upwardly through the aperture provided between the parallel clamping surfaces of the workholder.

The operator is now in position to start the machine. The shoe clamp is applied by the operation of the foot treadle which acts to depress the control shaft 156 and lug 155 which engages with the strap 154 to move the clamp toggle 151, 152 to its straightened position. The upper vamp spreader arm 147 is then grasped by the operator and moved manually downwardly to its clamping position in which it engages with the upwardly extending post 226 of the machine start microswitch (not shown) to start the machine.

The downwardly swinging movement of the weighted arm 212 as the vamp spreader toggle links 196, 198 are straightened causes the toggle to be moved to a beyond-center locking position.

In accordance with the invention a number of auxiliary devices are provided which are well adapted to assist in the guiding and supporting of a shoe upper mounted on the workholder with the lacing margins in either of the two alternative inside-up and outside-up positions above referred to. Auxiliary support is provided for the shoe upper particularly during the period when the clamping devices are released as the workholder returns to the loading station, and for the assistance of the operator in removing the eyeleted and laced upper from the machine by means of a shield or guard 310 which is of generally conical shape and extends slightly more than a quarter of the way about the turret beneath the projecting ways 131 from the unclamping station to the loading station of the machine. The shield 310 provides an auxiliary support for the upper when released by the clamping devices and also acts during the removal of the eyeleted and laced upper from the machine by the operator as a guiding surface to prevent engagement or catching of the heel portion of the upper with the lateral extension 192 associated with the lower vamp spreader arm 148. For this purpose the conical shield is constructed and arranged to permit the vamp spreader arm 148 to be moved downwardly so that the lateral extension 192 thereof is located beneath and is protected by the shield 310, as shown in Fig. 3. The shield 310 is of particular value to support and to guide the heel portion of a shoe upper supported with the outside surface facing upwardly and with the heel encircling the lower clamp and guideway. It will be understood that a similar support may be provided for shielding the heel portion of an upper supported with the inside surface facing upwardly from contact with the upper vamp spreader arm 147 during removal of the upper.

The invention having been described what is claimed is:

1. In a machine for operating upon shoe uppers having a plurality of operating, loading and unloading stations, a rotatable turret, a workholder projecting radially from the turret for movement with the turret to the different stations and comprising cooperating upper and lower clamping elements operable to clamp the shoe upper therebetween with the lacing margins in the opened-out edge-facing relation and with the heel portion of the upper placed toward the axis of the turret encircling one of said clamping elements, a vamp spreader having a transverse vamp spreader arm supported from the workholder at the same side thereof with the encircled clamping element for movement between an opened-out and a closed position against outer portions of the toe and vamp, and a shield supported from the machine at the same side of the workholder with the encircled clamping element and vamp spreader arm to engage with and position the heel portion of the upper clear of said vamp spreader arm when in said opened position.

2. In a machine for operating upon shoe uppers having a plurality of operating, loading and unloading stations, a rotatable turret, a workholder projecting radially from the turret for movement with the turret to the different stations and comprising cooperating upper and lower clamping elements projecting outwardly from the turret axis and operable to clamp the shoe upper therebetween with the lacing margins in an opened-out edge-facing relation and with the heel portion of the upper placed toward the axis of the turret encircling one of said clamping elements, a vamp spreader having a transverse vamp spreader arm supported from the workholder for movement between an opened-out and a closed position against the outer portions of the toe and vamp, and a shield supported from the machine at the unloading station at the same side of the workholder with the vamp spreader and located to guide the heel portion of the upper clear of the opened-out vamp spreader arm upon removal from the workholder.

3. In a machine for operating upon shoe uppers having a plurality of operating, loading and unloading stations, a rotatable turret, a workholder projecting radially from the turret for movement with the turret to the different stations and comprising cooperating upper and lower clamping elements operable to clamp the shoe upper therebetween with the lacing margins in an opened-out edge-facing relation and with the heel portion of the upper placed toward the axis of the turret encircling one of said clamping elements, a vamp spreader comprising a pair of vamp spreader elements formed with transverse vamp spreader arms arranged to engage therebetween the outer portions of the toe and vamp and pivotally supported from the workholder for movement between an opened-out and a closed position, and a shield supported from the machine at the unloading station at the same side of the workholder with the encircled clamping element to engage with and guide the encircling heel portion of the upper clear of said vamp spreader arm in opened-out position upon removal of the workholder.

4. In a machine for operating upon shoe uppers having a plurality of operating, loading and unloading stations, a rotatable turret, a workholder projecting radially from the turret for movement with the turret and comprising cooperating upper and lower clamping elements operable to clamp a shoe upper therebetween with the lacing margins in an opened-out edge-facing relation and with the heel portion of the upper placed toward the axis of the turret encircling one of said clamping elements, a vamp spreader comprising a pair of vamp spreader elements formed with transverse vamp spreader arms arranged to engage therebetween the outer portions of the toe and vamp and pivotally supported from the workholder for movement between an opened-out and a closed position, and a shield having a guide surface sloping outwardly away from the workholder and extending arcuately about the turret axis at the unloading station to engage with and position said encircling heel portion of the upper clear of the associated vamp spreader arm when in opened-out position for the removal of the upper from the workholder.

5. In a machine for operating upon shoe uppers having a plurality of operating, loading and unloading stations, a rotatable turret, a workholder projecting radially from the turret to be transferred by the turret to different stations, said workholder comprising cooperating upper and lower clamping elements operable to clamp a shoe upper therebetween with the lacing margins in an opened-out edge-facing relation and with the heel portion of the upper placed toward the axis of the turret encircling one of said clamping elements, a vamp spreader comprising a pair of vamp spreader elements formed with transverse vamp spreader arms arranged to engage therebetween the outer portions of the toe and vamp and pivotally supported from the workholder for movement between an opened-out and a closed position, and a shield supported from the machine at the unloading station at the same side of the workholder with the encircled clamping element and further supported with relation to said vamp spreader to engage with and to guide the heel portion of the upper clear of the vamp spreader arm upon removal from the workholder.

6. In a machine for operating upon shoe uppers having a rotatable turret, and a plurality of operating stations, an unloading station and a loading station located on the machine in successive quadrants about the turret, a workholder projecting radially from the turret to be transferred by the turret to successive stations, said workholder comprising upper and lower clamping elements operable to clamp a shoe upper therebetween with the lacing margins in an opened-out edge-facing relation and with the heel portion of the upper placed toward the axis of the turret encircling one of said clamping elements, a vamp spreader comprising a pair of vamp spreader elements formed with transverse vamp spreader arms arranged to engage therebetween the outer portions of the toe and vamp and pivotally supported from the workholder for movement between an opened-out and a closed position, and a shield supported from the machine having a guide surface sloping outwardly and downwardly from the workholding and extending arcuately about the turret axis past said unloading and loading stations to engage with and position said encircled heel portion of the upper clear of the associated vamp spreader arm when in opened-out position for the removal of the upper from the workholder.

No references cited.